April 12, 1932.   A. E. LINGO   1,853,566
SCAFFOLD
Filed May 20, 1930   2 Sheets-Sheet 1
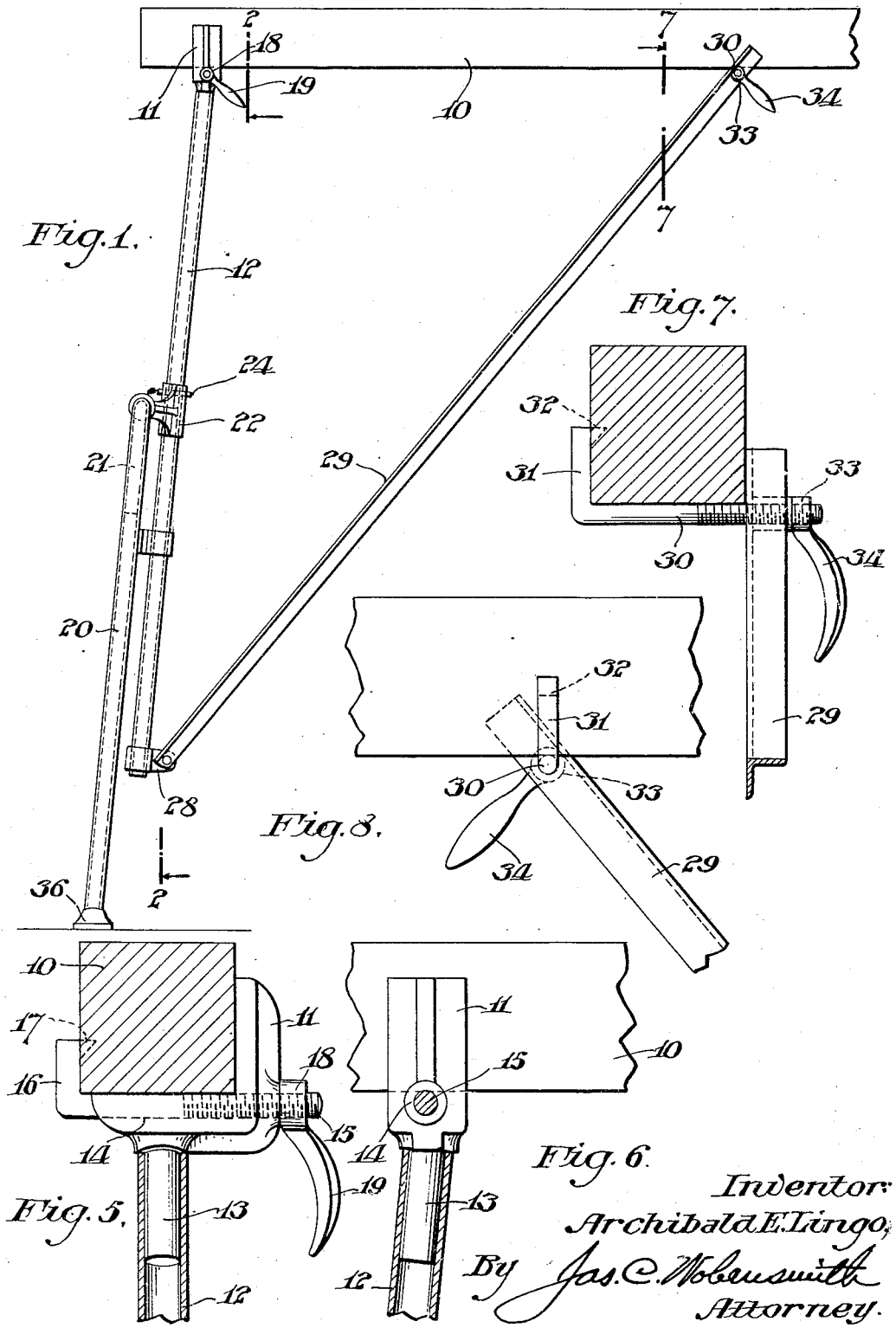

April 12, 1932.     A. E. LINGO     1,853,566
SCAFFOLD
Filed May 20, 1930    2 Sheets-Sheet 2
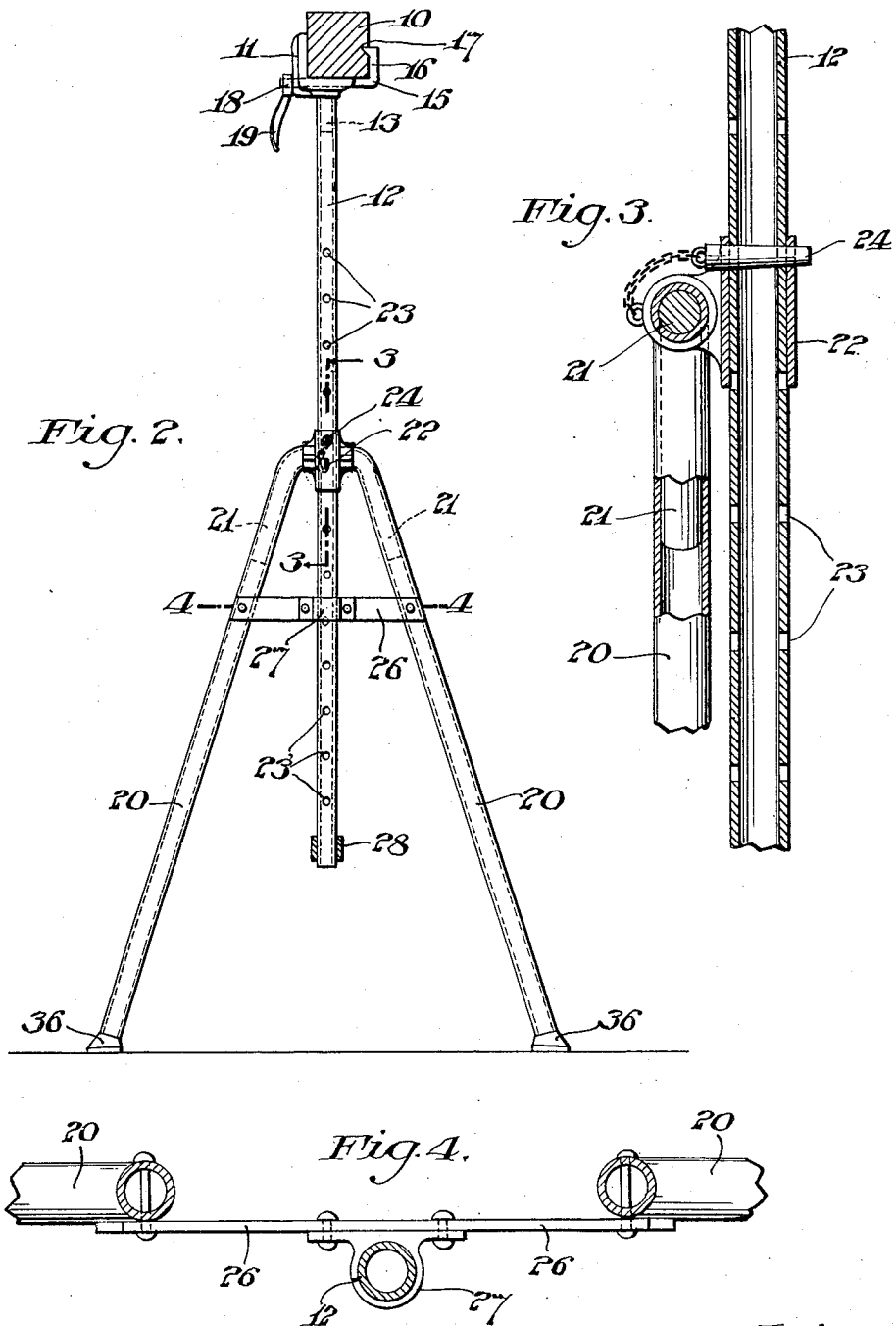
Inventor:
Archibald E. Lingo,
By Jas. C. Wobensmith
Attorney.

Patented Apr. 12, 1932

1,853,566

UNITED STATES PATENT OFFICE

ARCHIBALD E. LINGO, OF COLLINGSWOOD, NEW JERSEY

SCAFFOLD

Application filed May 20, 1930. Serial No. 453,955.

My invention relates to scaffolds, and it relates more particularly to scaffolds of the adjustable trestle type, such as are used in building operations by plasterers, painters, and the like.

The principal object of my present invention is to provide an improved form of scaffold, for use in various building operations, which will be simple, durable and efficient, which will be relatively light and inexpensive to construct, and which may be quickly and conveniently set up, adjusted, and dismantled.

The nature and characteristic features of my invention will be more readily understood from the following description, taken in connection with the accompanying drawings forming part hereof, in which:

Figure 1 is a side elevation of one end of a trestle structure embodying the main features of my present invention, it being understood that the other end is similar thereto;

Fig. 2 is a vertical section thereof, taken approximately on the line 2—2 of Fig. 1;

Fig. 3 is an enlarged vertical section taken approximately on the line 3—3 of Fig. 2;

Fig. 4 is an enlarged horizontal section taken approximately on the line 4—4 of Fig. 2;

Fig. 5 is an end elevation, partly in section, illustrating in enlarged detail the upper portion of one of the uprights of the trestle frame, and also illustrating the means for securing the top beam or plank thereto;

Fig. 6 is a front elevation, partly in section, of the structure shown in Fig. 5;

Fig. 7 is a transverse section taken approximately on the line 7—7 of Fig. 1, illustrating the means for securing the brace member of the trestle structure to the top beam or plank thereof; and Fig. 8 is a rear elevation of the portion of structure shown in Fig. 7.

Referring to the drawings, 10 is the top beam or plank of the trestle structure, each end portion of which is supported in a clamping member 11 carried at the upper end of a tubular upright 12, preferably made of steel pipe. The clamping member 11 comprises two portions extending at right angles to each other, to provide bearing surfaces against which the beam or plank 10 is seated. The clamping member 11 is also provided with a cylindrical extension 13, which is mounted in the upper end of the tubular upright 12.

Extending through the lower portion of the clamping member 11 is a channel 14, in which a fastening bolt 15 is seated. The bolt 15 is L-shaped, having an upward extension 16 at one end thereof. The upper end of the extension 16 is provided with a prong 17, which is adapted to bite into the beam or plank 10, which is usually made of wood.

The other end of the bolt 15 is threaded and extends through a bore at the front of the member 11, and upon this threaded portion a nut 18 is mounted. The nut 18 is provided with a handle 19 for convenient manipulation. By this arrangement the plank 10 may be readily clamped to the member 11.

The tubular upright 12 is adjustably secured, in a manner to be presently explained, to the leg portion 20 of the trestle structure. The leg portion 20 is also made of a tubular member, such as steel pipe, suitably bent in an inverted V-form to provide diverging legs (see Fig. 2). The bent or apex part of the leg structure 20 is reinforced by the insertion of a round bar 21, of sufficient length to extend down into the legs of the structure.

Upon the apex or bent part of the leg portion, there is mounted a bracket 22 having an extension in which the upright 12 is adjustably mounted. The adjustment of the upright with respect to the leg structure is preferably made by providing the upright with a plurality of apertures 23, suitably spaced, whereby a pin 24 may lock the upright in adjusted relationship in the bracket member 22, it being understood that the pin 24 also extends through suitable apertures in the extension of the bracket 22 when the proper apertures 23 are brought into register therewith.

A horizontal strut 26 is fixedly and permanently secured to the leg structure, at a suitable distance below the apex thereof. The strut 26 carries a bracket 27 intermediate its ends, the bracket 27 serving as an additional support for the upright 12, whereby the same will be held in proper relationship with respect to the leg structure.

At the lower end of the upright 12 a bracket 28 is secured, to which the lower end of a diagonal brace member 29 is pivotally connected. The diagonal brace member 29 is preferably made of angle iron or the like, and the upper end thereof carries a hook bolt 30, the end of which extends upwardly, as at 31, and is provided with a prong 32 which is adapted to engage and bite into the top beam or plank 10 of the trestle structure.

The other end of the bolt 30 is threaded, and upon the threaded portion a nut 33 is mounted, for the purpose of tightening the bolt 30 and thereby securely attaching the upper end of the brace 29 to the beam 10. The nut 33 is provided with a handle 34 for convenient manipulation.

The lower end of each leg is provided with a foot casting 36, so as to provide enlarged bearing surfaces for the leg members.

When it is desired to set up the scaffold, the beam or plank 10 is mounted in the clamping member 11 carried at the upper end of the upright 12. The nut 18 is then tightened on the bolt 15, causing the prong 17 in the upturned portion of the bolt 15 to engage the side of the plank 10 and bind the same against the upright portion of the clamping member 11.

The brace member 29 is then secured in a similar manner, by causing the bolt 30 to engage the beam 10, and then tightening the nut 33 of the bolt 30 to cause the prong 32 to bite into the beam 10 and to bind the same against the upper end of the brace member 20.

The beam may now be adjusted to the proper elevation by sliding the upright 12 in the brackets 22 and 27, after which the pin 24 may be inserted in the registering apertures to hold the upright in the proper adjusted position.

It will be noted that the plane of the leg structure 20 is canted inwardly out of the vertical, and that the adjustable upright 12 extends parallel thereto, the upper end of the brace member being secured to the top beam 10 at a suitable location so as to maintain this position of the leg structure and upright. This arrangement results in greater rigidity of the scaffold, greatly minimizing end sway in the beam or plank 10.

By reason of the main members of the scaffold being of tubular form, the same may be made of steel pipe, which is readily obtainable at low cost, yet the utmost rigidity for a given weight of structure will be afforded.

I claim:

1. A scaffold structure of the trestle type comprising the combination of a top beam, an inverted V-shaped leg frame made of a single continuous piece of tubing, a reinforcing rod positioned internally at the apex of the leg frame and having its ends extending down into the legs of said frame, a bracket mounted at the apex of said leg frame, a tubular upright adjustably mounted in said bracket, and means for securing the top beam to the upper end of said upright.

2. A scaffold structure of the trestle type comprising the combination of a top beam, an inverted V-shaped leg frame made of a single continuous piece of tubing, a reinforcing rod positioned internally at the apex of the leg frame and having its ends extending down into the legs of said frame, a bracket mounted at the apex of said leg frame, a tubular upright adjustably mounted in said bracket, a clamping member mounted at the upper end of said upright, means for clamping the top beam to said clamping member, and a brace member connected at one end to the lower end of the upright and at the other end to the top beam.

In testimony whereof, I have hereunto signed my name.

ARCHIBALD E. LINGO.